US008002653B2

(12) United States Patent
Shiozaki et al.

(10) Patent No.: US 8,002,653 B2
(45) Date of Patent: Aug. 23, 2011

(54) POWER UNIT HAVING ENGINE AND CONTINUOUSLY VARIABLE TRANSMISSION, CONFIGURATION THEREOF, AND VEHICLE INCORPORATING SAME

(75) Inventors: Tomoo Shiozaki, Saitama (JP); Toshimasa Mitsubori, Saitama (JP); Erika Hara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 632 days.

(21) Appl. No.: 12/002,679

(22) Filed: Dec. 18, 2007

(65) Prior Publication Data

US 2008/0161142 A1 Jul. 3, 2008

(30) Foreign Application Priority Data

Dec. 28, 2006 (JP) ................................ 2006-356242

(51) Int. Cl.

| | |
|---|---|
| ***F16H 55/56*** | (2006.01) |
| ***B60S 9/205*** | (2006.01) |
| ***B60S 9/21*** | (2006.01) |
| ***B60S 9/10*** | (2006.01) |
| ***B60S 9/20*** | (2006.01) |

(52) U.S. Cl. ............ 474/8; 180/199; 180/200; 180/201; 180/202; 180/203

(58) Field of Classification Search ................ 474/8–46, 474/50; 475/210, 211; 477/44–49, 39; 180/199–203, 219, 230, 233
See application file for complete search history.

(56) References Cited

U.S. PATENT DOCUMENTS

| | | | | |
|---|---|---|---|---|
| 3,811,528 | A * | 5/1974 | Hooper | 180/228 |
| 4,344,500 | A * | 8/1982 | Kurata et al. | 180/230 |
| 4,345,664 | A * | 8/1982 | Anno et al. | 180/230 |
| 4,433,594 | A * | 2/1984 | Smirl | 475/206 |
| 4,497,285 | A * | 2/1985 | Kondo | 123/41.65 |
| 4,526,061 | A * | 7/1985 | Sakakibara et al. | 474/28 |
| 4,541,821 | A * | 9/1985 | Sakakibara | 474/17 |
| 4,608,885 | A * | 9/1986 | Koivunen | 475/210 |
| 4,697,660 | A * | 10/1987 | Wu et al. | 180/65.25 |
| 4,723,619 | A * | 2/1988 | Yamamoto et al. | 180/219 |
| 4,904,229 | A * | 2/1990 | Hattori | 474/12 |
| 4,973,288 | A * | 11/1990 | Sakakibara et al. | 474/8 |
| 5,006,092 | A * | 4/1991 | Neuman et al. | 474/8 |

(Continued)

FOREIGN PATENT DOCUMENTS

CN 1755173 (A) 4/2006

(Continued)

*Primary Examiner* — Michael R. Mansen
*Assistant Examiner* — Henry Liu
(74) *Attorney, Agent, or Firm* — Carrier Blackman & Associates, P.C.; William D. Blackman; Joseph P. Carrier

(57) ABSTRACT

A power unit includes an engine having a crankshaft, and a continuously variable transmission having a drive pulley operatively connected with the crankshaft, a driven pulley, and a belt extended between and wrapped around the drive pulley and the driven pulley. The power unit further includes a transmission input clutch, which allows or interrupts the transmission of a rotational drive force of the crankshaft to the drive pulley, mounted on a drive pulley shaft; and a starter clutch, which allows or interrupts the transmission of a rotational drive force of the driven pulley to the drive wheel, mounted on a driven pulley shaft. The transmission input clutch and the starter clutch are arranged such that a continuously variable transmission is sandwiched therebetween.

5 Claims, 8 Drawing Sheets

U.S. PATENT DOCUMENTS

| | | | | | |
|---|---|---|---|---|---|
| 5,046,576 | A * | 9/1991 | Miyawaki | 180/233 |
| 5,094,652 | A * | 3/1992 | Sakakibara et al. | 474/8 |
| 5,152,361 | A * | 10/1992 | Hasegawa et al. | 180/230 |
| 5,172,786 | A * | 12/1992 | Ishibashi et al. | 180/190 |
| 5,470,285 | A * | 11/1995 | Schneider et al. | 475/210 |
| 5,553,586 | A * | 9/1996 | Koishikawa et al. | 123/195 P |
| 5,845,618 | A * | 12/1998 | Taue et al. | 123/317 |
| 6,086,493 | A * | 7/2000 | Goshima et al. | 474/50 |
| 6,182,784 | B1 * | 2/2001 | Pestotnik | 180/376 |
| 6,336,888 | B1 * | 1/2002 | Eguchi | 477/3 |
| 6,397,964 | B1 * | 6/2002 | Yamauchi | 180/229 |
| 6,405,821 | B2 * | 6/2002 | Tsutsumikoshi | 180/226 |
| 6,481,408 | B2 * | 11/2002 | Tsutsumikoshi | 123/195 R |
| 6,497,211 | B2 * | 12/2002 | Nomura et al. | 123/195 R |
| 6,513,609 | B2 * | 2/2003 | Hasegawa | 180/65.6 |
| 6,544,134 | B2 * | 4/2003 | Ohyama et al. | 474/144 |
| 6,591,934 | B2 * | 7/2003 | Tsutsumikoshi | 180/291 |
| 6,652,399 | B2 * | 11/2003 | Van Spijk et al. | 474/28 |
| 6,666,290 | B2 * | 12/2003 | Yamauchi | 180/68.1 |
| 6,758,197 | B2 * | 7/2004 | Korenjak et al. | 123/572 |
| 6,767,309 | B2 * | 7/2004 | Fujimoto et al. | 477/44 |
| 6,823,956 | B2 * | 11/2004 | Shimizu | 180/68.1 |
| 6,896,087 | B2 * | 5/2005 | Korenjak et al. | 180/292 |
| 6,902,502 | B2 * | 6/2005 | Murakami et al. | 474/23 |
| 6,978,857 | B2 * | 12/2005 | Korenjak | 180/292 |
| 6,997,831 | B2 * | 2/2006 | Kanda et al. | 474/8 |
| 7,044,253 | B2 * | 5/2006 | Takenaka et al. | 180/219 |
| 7,063,063 | B2 * | 6/2006 | Morii et al. | 123/198 R |
| 7,163,074 | B2 * | 1/2007 | Inomori et al. | 180/219 |
| 7,163,476 | B2 * | 1/2007 | Yoshida | 474/8 |
| 7,201,686 | B2 * | 4/2007 | Masuda et al. | 474/144 |
| 7,240,758 | B2 * | 7/2007 | Korenjak et al. | 180/292 |
| 7,243,564 | B2 * | 7/2007 | Chonan et al. | 74/329 |
| 7,278,939 | B2 * | 10/2007 | Sato et al. | 474/72 |
| 7,311,623 | B2 * | 12/2007 | Masuda et al. | 474/8 |
| 7,316,626 | B2 * | 1/2008 | Oishi et al. | 474/144 |
| 7,343,998 | B2 * | 3/2008 | Morin et al. | 180/233 |
| 7,351,173 | B2 | 4/2008 | Uchisasai et al. | |
| 7,377,351 | B2 * | 5/2008 | Smith et al. | 180/233 |
| 7,478,696 | B2 * | 1/2009 | Ishida et al. | 180/219 |
| 7,487,853 | B2 * | 2/2009 | Ishida et al. | 180/219 |
| 7,497,288 | B2 * | 3/2009 | Tsukada et al. | 180/68.1 |
| 7,506,718 | B2 * | 3/2009 | Morita et al. | 180/376 |
| 7,549,496 | B2 * | 6/2009 | Ishida et al. | 180/228 |
| 7,604,557 | B2 * | 10/2009 | Ho | 474/8 |
| 7,610,987 | B2 * | 11/2009 | Aoyama | 180/374 |
| 7,625,306 | B2 * | 12/2009 | Sato | 474/80 |
| 7,648,435 | B2 * | 1/2010 | Ishida et al. | 474/8 |
| 7,654,926 | B2 * | 2/2010 | Tanaka et al. | 474/181 |
| 2002/0017266 | A1 * | 2/2002 | Tsutsumikoshi | 123/195 R |
| 2004/0077444 | A1 * | 4/2004 | Kanda et al. | 474/8 |
| 2004/0124029 | A1 * | 7/2004 | Takenaka et al. | 180/291 |
| 2005/0087032 | A1 * | 4/2005 | Kawakubo et al. | 74/473.1 |
| 2005/0119076 | A1 * | 6/2005 | Chonan et al. | 474/29 |

FOREIGN PATENT DOCUMENTS

| | | | |
|---|---|---|---|
| CN | 1806106 (A) | | 7/2006 |
| JP | 63-103784 | | 5/1988 |
| JP | 04-165149 | A | 6/1992 |
| JP | 2001-080567 | A | 3/2001 |
| JP | 2001-334985 | A | 12/2001 |
| JP | 2003-306191 | A | 10/2003 |
| WO | WO 2004/111409 | | 12/2004 |

* cited by examiner

POWER UNIT HAVING ENGINE AND CONTINUOUSLY VARIABLE TRANSMISSION, CONFIGURATION THEREOF, AND VEHICLE INCORPORATING SAME

CROSS-REFERENCE TO RELATED APPLICATIONS

The present application claims priority under 35 USC §119 based on Japanese patent application No. 2006-356242, filed on Dec. 28, 2006. The entire subject matter of this priority document is herein incorporated by reference.

BACKGROUND OF THE INVENTION

1. Field of the Invention

The present invention relates to a power unit having an engine and a continuously variable transmission (CVT), and to a vehicle incorporating same. More particularly, the present invention relates to a power unit having a hydraulically-operated CVT and to an arrangement (layout) of various components of the CVT within the power unit.

2. Description of the Backgound Art

There are known power units for a vehicle, such as a motorcycle, having an engine and a CVT. In such power units, a power transmission chamber, which is integrally formed with a crank chamber of the engine, is generally disposed behind the crank chamber of the engine.

The continuously variable transmission, such as a wet belt-type automatic transmission, is arranged in a lowermost portion of a common chamber formed by the crank chamber and the power transmission chamber. The common chamber functions as the crank chamber as well as the power transmission chamber.

In the power unit having the continuously variable automatic transmission (automatic transmission), an oil pan is arranged in a lower portion of the power unit. The oil pan receives oil for lubricating the engine and various components of a power transmission system.

The power unit includes a drive pulley and a driven pulley, which are connected to the engine (e.g., to a crankshaft of the engine), arranged in the power transmission chamber.

Further, the drive pulley and the driven pulley are arranged in a vertically displaced manner such that rotational axes of the drive pulley and the driven pulley are arranged in parallel to an axis of the crankshaft of the engine. In such configurations, both drive and driven pulleys overlap each other when viewed from above, in a top plan view.

An example of such known power unit is disclosed in the Japanese Patent Document JP-A-63-103784. According to the Japanese Patent Document JP-A-63-103784 (page 1, FIG. 2), the power unit includes a starter clutch which is mounted on a shaft portion of a drive pulley shaft. The starter clutch transmits a rotational drive force of the engine to a drive wheel at the time of starting a vehicle and interrupts the transmission of the rotational drive force of the engine to the drive wheel at the time of stopping the vehicle.

Here, since in the power unit of the vehicle according to the Japanese Patent Document JP-A-63-103784, the starter clutch is mounted on the shaft portion of the drive pulley shaft, the starter clutch is disengaged from a gear arrangement before the CVT assumes a low speed state at the time of stopping the vehicle. However, there exists a possibility that the CVT is driven in a high speed state at the time of starting the vehicle next time thus lowering the maneuverability of the vehicle.

Further, a large-sized starter is required for starting the engine when the starter clutch is mounted on the shaft portion of the drive pulley shaft because a large load is applied to the starter since the starter drives the CVT while rotating the crankshaft. Therefore, mounting of the starter clutch on the shaft portion of the drive pulley shaft leads to a requirement of a large-sized, high capacity starter.

The present invention has been made to overcome such drawbacks. Accordingly, it is an object of the present invention to provide a power unit for a vehicle which enhances the maneuverability at the time of starting the vehicle by bringing a CVT into a low speed state at the time of stopping the vehicle. It is also an object of the present invention to provide a power unit which reduces a load applied to the starter by interrupting the transmission of a rotational drive force of the crankshaft to the drive pulley at the time of starting the engine.

SUMMARY OF THE INVENTION

To achieve the above-mentioned objects, the present invention according a first aspect provides a power unit for a vehicle, such as a motorcycle, having an engine and a continuously variable transmission (CVT). The CVT includes a drive pulley shaft to which a rotational drive force of a crankshaft of the engine is transmitted, a drive pulley which is mounted on a shaft portion of a drive pulley shaft, a driven pulley shaft to which a rotational drive force of the drive pulley shaft is transmitted, a driven pulley which is mounted on a shaft portion of the driven pulley shaft, and a belt which is extended between and wrapped around the drive pulley and the driven pulley for transmitting the rotational drive force of the drive pulley shaft to the driven pulley shaft, and for transmitting a rotational drive force of the crankshaft to a drive wheel while continuously changing a vehicle speed by changing wrapping diameters of the belt on the drive pulley and the driven pulley.

The power unit according the first aspect further includes a transmission input clutch arranged between the crankshaft and the drive pulley, and a starter clutch arranged between the driven pulley and the drive wheel. The transmission input clutch allows or interrupts the transmission of the rotational drive force of the crankshaft to the drive pulley. The starter clutch allows or interrupts the transmission of a rotational drive force of the driven pulley shaft to the drive wheel. The transmission input clutch and the starter clutch are arranged with the CVT sandwiched therebetween, that is, the transmission input clutch is arranged on one side of the belt of the CVT and the starter clutch is arranged on the other side thereof.

The present invention according to a second aspect, in addition to the first aspect, is characterized in that the transmission input clutch is mounted on a shaft portion of the drive pulley shaft, and the starter clutch is mounted on a shaft portion of the driven pulley shaft.

The present invention according a third aspect, in addition to the first aspect, is characterized in that the power unit includes an oil pump for supplying oil to the CVT, the transmission input clutch and the starter clutch. The power unit according the third aspect also includes a water pump which circulates cooling water inside the engine to provide cooling thereto. The transmission input clutch, the oil pump and the water pump are arranged with the CVT sandwiched therebetween. In other words, the oil pump and the water pump are mounted at one side of CVT on the shaft portion of the drive pulley shaft and the transmission input clutch is arranged at the other side of the CVT on the shaft portion of the drive pulley shaft.

The present invention according to a fourth aspect, in addition to the first aspect, is characterized in that the starter clutch is arranged at a level below the transmission input clutch.

The present invention according to a fifth aspect, in addition to the third aspect, is characterized in that the crankshaft, the drive pulley shaft and the driven pulley shaft are arranged in parallel to each other and extend in a vehicle-width direction. According to the fifth aspect, the drive pulley shaft is arranged above the driven pulley shaft, and the oil pump and the water pump are arranged on a shaft end of the drive pulley shaft.

The present invention according to a sixth aspect, in addition to the first aspect, is characterized in that the crankshaft, the drive pulley shaft and the driven pulley shaft are arranged in parallel to each other and extend in the vehicle-width direction. The power unit of the present invention further includes a final drive gear is arranged between the driven pulley and the starter clutch and mounted on the shaft portion of the driven pulley shaft. The final drive gear transmits the rotational drive force of the driven pulley shaft to the drive wheel.

The present invention according to a seventh aspect, in addition to the sixth aspect, is characterized in that the crankshaft, the drive pulley shaft and the driven pulley shaft are arranged in parallel to each other and extend a vehicle-width direction. According to the seventh aspect the engine includes an output shaft having a final driven gear mounted thereon. The final driven gear is meshed with the final drive gear. The final driven gear transmits the rotational drive force of the driven pulley shaft to the drive wheel.

Further, according to the seventh aspect of the present invention, a bearing which rotatably supports the output shaft is arranged more inwardly in the vehicle-width direction than a bearing which rotatably supports the driven pulley shaft.

The present invention according a eighth aspect, in addition to the first aspect, is characterized in that the power unit includes a final drive gear, which is mounted on the shaft portion of the driven pulley shaft and which transmits the rotational drive force of the driven pulley shaft to the drive wheel, and the final drive gear is arranged between the transmission input clutch and the starter clutch.

The present invention according to a ninth aspect, in addition to the first aspect, is characterized in that the power unit includes a final drive gear which is mounted on the shaft portion of the driven pulley shaft and transmits the rotational drive force of the driven pulley shaft to the drive wheel, and a primary driven gear which is mounted on the shaft portion of the drive pulley shaft and transmits the rotational drive force of the crankshaft to the drive pulley shaft. The final drive gear and the primary driven gear are arranged such that the CVT is sandwiched therebetween, and that the final drive gear is arranged on the starter clutch side and the primary driven gear is arranged on the transmission input clutch side.

The present invention according to a tenth aspect, in addition to the first aspect, is characterized in that the power unit includes an oil pump for supplying oil to the CVT, the transmission input clutch and the starter clutch. The drive pulley is rotatably supported on the drive pulley shaft and is rotatably driven together with the drive pulley shaft when the transmission input clutch assumes an engagement state. The oil pump is arranged on the shaft portion of the drive pulley shaft and is rotatably driven together with the drive pulley shaft.

The present invention according an eleventh aspect provides a power unit having an engine and a continuously variable transmission (CVT). The CVT includes a drive pulley shaft to which a rotational drive force of engine's crankshaft is transmitted, a drive pulley which is mounted on a shaft portion of the drive pulley shaft, a driven pulley shaft to which a rotational drive force of the drive pulley shaft is transmitted, a driven pulley which is mounted on a shaft portion of the driven pulley shaft, and a belt which is extended between and wrapped around the drive pulley and the driven pulley for transmitting the rotational drive force of the drive pulley shaft to the driven pulley shaft.

The power unit according to the eleventh aspect of the present invention further includes an oil pump for supplying oil to the CVT, the transmission input clutch and the starter clutch, and a water pump for circulating cooling water inside the engine. The power unit also includes a final drive gear, a primary driven gear and a generator. The final drive gear mounted on a shaft portion of the driven pulley shaft. The final drive gear transmits the rotary drive force of the driven pulley shaft to the drive wheel. The primary driven gear is mounted on a shaft portion of the drive pulley shaft, and transmits the rotary drive force of the crankshaft to the drive pulley shaft. The generator is mounted on a shaft portion of the crankshaft, and the CVT transmits a rotary drive force of the crankshaft to the drive wheel while continuously changing a vehicle speed by changing wrapping diameters of the belt on the drive pulley and the driven pulley.

The power further unit includes a transmission input clutch arranged between the crankshaft and the drive pulley, and a starter clutch arranged between the driven pulley and the drive wheel. The transmission input clutch allows or interrupts the transmission of the rotational drive force of the crankshaft to the drive pulley. The starter clutch allows or interrupts the transmission of a rotational drive force of the driven pulley shaft to the drive wheel. The CVT is arranged in an offset manner with respect to a vehicle-width direction, that is, the CVT is arranged on one side in a vehicle-width direction from the center of the engine of the vehicle. The transmission input clutch and the primary driven gear are arranged on an offset side, and the starter clutch, the oil pump, the water pump, the final drive gear and the generator are arranged on a side opposite to the offset side.

ADVANTAGE OF THE INVENTION

According to the power unit of the vehicle as described in the first aspect, the transmission input clutch, which allows or interrupts the transmission of the rotational drive force of the crankshaft to the drive pulley, is arranged between the crankshaft and the drive pulley. The starter clutch, which allows or interrupts the transmission of a rotational drive force of the driven pulley shaft to the drive wheel, is arranged between the driven pulley and the drive wheel. The transmission input clutch and the starter clutch are arranged with the CVT sandwiched therebetween in a state that the transmission input clutch is arranged on one of sides which sandwich the belt therebetween and the starter clutch is arranged on another side.

Therefore, even when the starter clutch is disengaged before the CVT assumes a low speed state at the time of stopping the vehicle, the rotational drive force of the crankshaft is transmitted to the CVT by way of the transmission input clutch. As a result, it is possible to bring the CVT from a high speed state into a low speed state whereby the maneuverability of the vehicle at the time of starting the vehicle can be enhanced.

Further, it is possible to interrupt the transmission of the rotational drive force of the crankshaft to the drive pulley at the time of starting the engine. Hence, a load applied to the starter can be reduced thus realizing miniaturization of the starter.

Further, the transmission input clutch and the starter clutch, which are heavy components (objects), can be arranged on both sides in the vehicle-width direction in a well-balanced manner with the CVT sandwiched therebetween. Hence, the maneuverability of the vehicle can be enhanced.

According to the power unit as described in the second aspect of the present invention, the transmission input clutch is mounted on a shaft portion of the drive pulley shaft, and the starter clutch is mounted on a shaft portion of the driven pulley shaft. Accordingly, the shaft on which the respective pulleys are mounted and the shaft on which the respective clutches are mounted are formed of the same shafts. Hence, compared to a power unit in which shafts are provided separately for the clutches and the pulleys, the number of shafts can be decreased which results in decreased number of parts such that the miniaturization of the power unit including the engine can be realized.

According to the power unit as described in the third aspect, the power includes the oil pump which supplies oil to the CVT, the transmission input clutch and the starter clutch, and a water pump which circulates cooling water inside the engine. The transmission input clutch, the oil pump and the water pump are arranged with the CVT sandwiched therebetween in a state that the oil pump and the water pump are mounted on the shaft portion of the drive pulley shaft on a side opposite to mounting of the transmission input clutch on the other side of the CVT.

Accordingly, the transmission input clutch, the oil pump and the water pump which are generally heavy components can be arranged on both sides of the CVT in a well-balanced manner with the CVT sandwiched therebetween. Hence, the maneuverability of the vehicle can be enhanced. Further, the oil pump and the water pump are mounted on a single shaft, e.g., drive pulley shaft. Hence, compared to a power unit in which the oil pump and the water pump are mounted on different shafts, drive parts of the respective pumps and spaces for arranging the respective pumps become unnecessary, which results in miniaturization of the power unit.

According to the power unit as described in the fourth aspect, the starter clutch is arranged at a level below the transmission input clutch. Accordingly, the center of gravity of the engine can be lowered and hence, the maneuverability of the vehicle can be enhanced. Here, the starter clutch transmits the larger rotational drive force than the transmission input clutch at the time of starting the vehicle or the like and hence, the clutch capacitance becomes large whereby the starter clutch is liable to become large-sized compared to the transmission input clutch and possesses a considerable weight.

According to the power unit as described in the fifth aspect, the crankshaft, the drive pulley shaft and the driven pulley shaft are arranged parallel to each other and extend in the vehicle-width direction. The drive pulley shaft is arranged above the driven pulley shaft, and the oil pump and the water pump are arranged on a shaft end of the drive pulley shaft. Accordingly, the transmission input clutch and the starter clutch, and the oil pump and the water pump are arranged on the shaft end of the drive pulley shaft, the oil pump and the water pump are arranged at a position higher than the driven pulley shaft, that is, at an upper high position of the engine. Hence, there is no possibility that a bank angle of the vehicle determined by a step is not influenced by the oil pump and the water pump.

According to the power unit as described in the sixth aspect, the crankshaft, the drive pulley shaft and the driven pulley shaft are arranged in parallel to each other and extend the vehicle-width direction, a final drive gear which transmits the rotational drive force of the driven pulley shaft to the drive wheel is mounted on the shaft portion of the driven pulley shaft, and the final drive gear is arranged between the driven pulley and the starter clutch. Hence, the bearing which rotatably supports the output shaft can be arranged more inwardly in the vehicle-width direction than the bearing which rotatably supports the driven pulley shaft. Accordingly, in mounting the drive sprocket wheel on the shaft end of the output shaft, for example, the drive sprocket wheel can be arranged inside in the vehicle width direction. Hence, the miniaturization of the power unit can be realized.

According to the power unit as described in the seventh aspect, the crankshaft, the drive pulley shaft and the driven pulley shaft are arranged in parallel to each other and extend in the vehicle-width direction, and the engine includes the output shaft which mounts the final driven gear meshed with the final drive gear thereon and transmits the rotational drive force of the driven pulley shaft to the drive wheel, and the bearing which rotatably supports the output shaft is arranged more inwardly in the vehicle-width direction than the bearing which rotatably supports the driven pulley shaft. Accordingly, in mounting a drive sprocket wheel on a shaft end of the output shaft, for example, the drive sprocket wheel can be arranged inwardly of the vehicle-width direction. Hence, the miniaturization of the power unit can be realized.

According to the power unit, as described in the eight aspect, the power unit includes the final drive gear mounted on the shaft portion of the driven pulley shaft and which transmits the rotational drive force of the driven pulley shaft to the drive wheel. The final drive gear is arranged between the transmission input clutch and the starter clutch. Hence, a bearing which rotatably supports the output shaft can be arranged more inside the engine than the shaft end of the driven pulley shaft and the shaft end of the drive pulley shaft. Accordingly, in mounting the drive sprocket wheel on the shaft end of the output shaft, for example, a projecting quantity of the drive sprocket wheel toward the outside of the engine can be reduced thus realizing the miniaturization of power unit.

According to the power unit as described in the ninth aspect, the power unit includes the final drive gear mounted on the shaft portion of the driven pulley shaft, and the primary driven gear mounted on the shaft portion of the drive pulley shaft. The final drive gear transmits the rotational drive force of the driven pulley shaft to the drive wheel. The primary driven gear transmits the rotational drive force of the crankshaft to the drive pulley shaft. The final drive gear and the primary driven gear are arranged with the CVT sandwiched therebetween, such that the final drive gear is arranged on the starter clutch side and the primary driven gear is arranged on the transmission input clutch side.

Accordingly, the transmission input clutch, the starter clutch the final drive gear and the primary driven gear, which are heavy components of the power unit, can be arranged on both sides of the CVT in a well-balanced manner. Hence, the maneuverability of the vehicle can be enhanced.

According to the power unit as described in the tenth aspect, the power unit includes an oil pump for supplying oil to the CVT, the transmission input clutch and the starter clutch, and the drive pulley is rotatably supported on the drive pulley shaft and is rotatably driven together with the drive pulley shaft when the transmission input clutch assumes an engagement state, and the oil pump is arranged on the shaft portion of the drive pulley shaft and is rotatably driven together with the drive pulley shaft and hence, by bringing the transmission input clutch into a disengagement state at the time of starting the engine, it is possible to drive the oil pump without driving the CVT.

Accordingly, an oil pressure for controlling the transmission input clutch and the CVT can be acquired. Hence, before engaging the transmission input clutch, it is possible to push the respective pulleys to the belt by applying the oil pressure to the respective pulleys whereby it is possible to suppress the generation of slippage between the respective pulleys and the belt at the time of engaging the transmission input clutch after starting the engine.

According to the power unit as described in the eleventh aspect, the transmission input clutch which allows or interrupts the transmission of the rotational drive force of the crankshaft to the drive pulley is arranged between the crankshaft and the drive pulley. The starter clutch which allows or interrupts the transmission of a rotational drive force of the driven pulley shaft to the drive wheel is arranged between the driven pulley and the drive wheel. The CVT is arranged in an offset manner on one side in the vehicle width direction from the center of the engine of a motorcycle, the transmission input clutch and the primary driven gear are arranged on an offset side, and the starter clutch, the oil pump, the water pump, the final drive gear and the generator are arranged on a side opposite to the offset side.

Accordingly, even when the starter clutch is disengaged before the CVT assumes a low speed state at the time of stopping a vehicle, the rotational drive force of the crankshaft is transmitted to the CVT by way of the transmission input clutch. Hence, it is possible to bring the CVT from a high speed state into a low speed state whereby the maneuverability of the vehicle at the time of starting the vehicle can be enhanced.

Further, it is possible to interrupt the transmission of the rotational drive force of the crankshaft to the drive pulley at the time of starting the engine. Hence, a load applied to the starter can be reduced thus realizing miniaturization of the starter. Further, the transmission input clutch, the primary driven gear, the starter clutch, the oil pump, the water pump, the final drive gear and the generator which are heavy components can be arranged on both sides of a vehicle body center line in a well-balanced manner with the vehicle body center line sandwiched therebetween. Hence, the maneuverability of the vehicle can be enhanced.

For a more complete understanding of the present invention, the reader is referred to the following detailed description section, which should be read in conjunction with the accompanying drawings.

DETAILED DESCRIPTION OF ILLUSTRATIVE EMBODIMENTS

It should be understood that only structures considered necessary for illustrating selected embodiments of the present invention are described herein. Other conventional structures, and those of ancillary and auxiliary components of the system, will be known and understood by those skilled in the art.

Hereinafter, illustrative embodiments of a power unit having an engine according to the present invention are explained in detail in conjunction with attached drawings. Here, the drawings are viewed in the direction of symbols.

Figure 1:
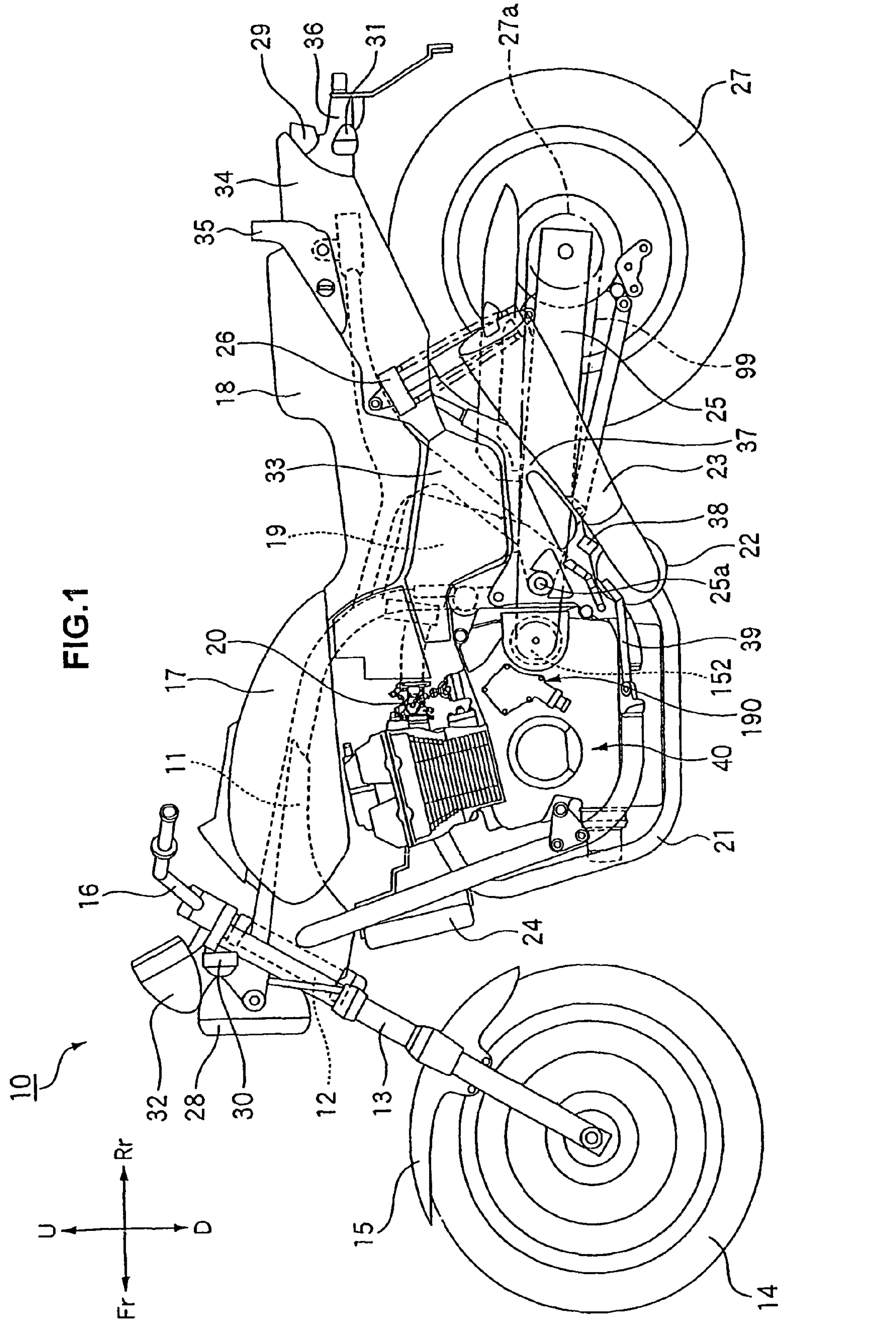
FIG. 1 is a side view of a vehicle (a motorcycle) having a power unit including an engine and a continuously variable transmission (CVT) mounted thereon according to the present invention thereon.
Figure 2:
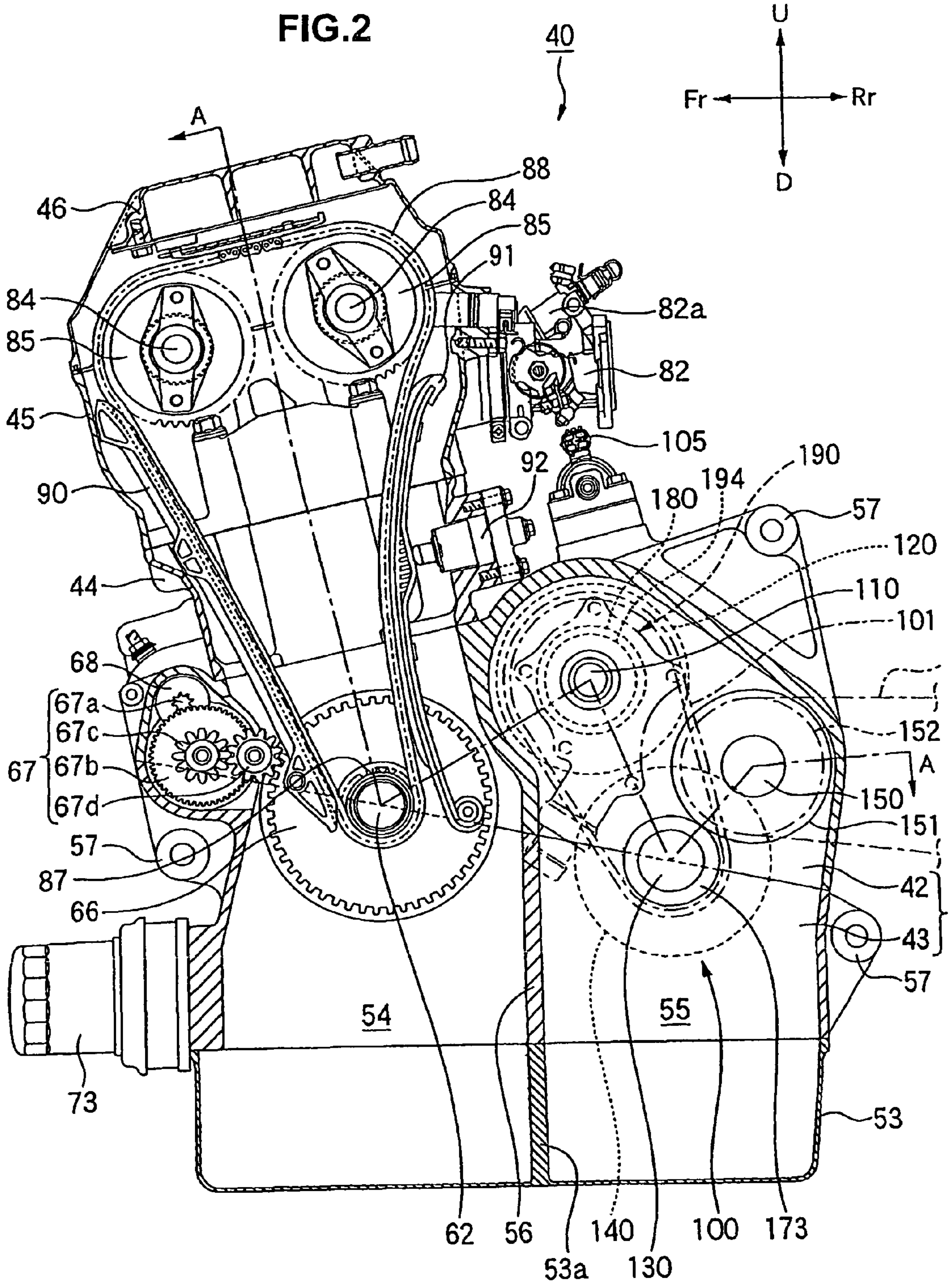
FIG. 2 is a left side view with a part broken away of the power unit of the vehicle shown in FIG. 1.
Figure 3:
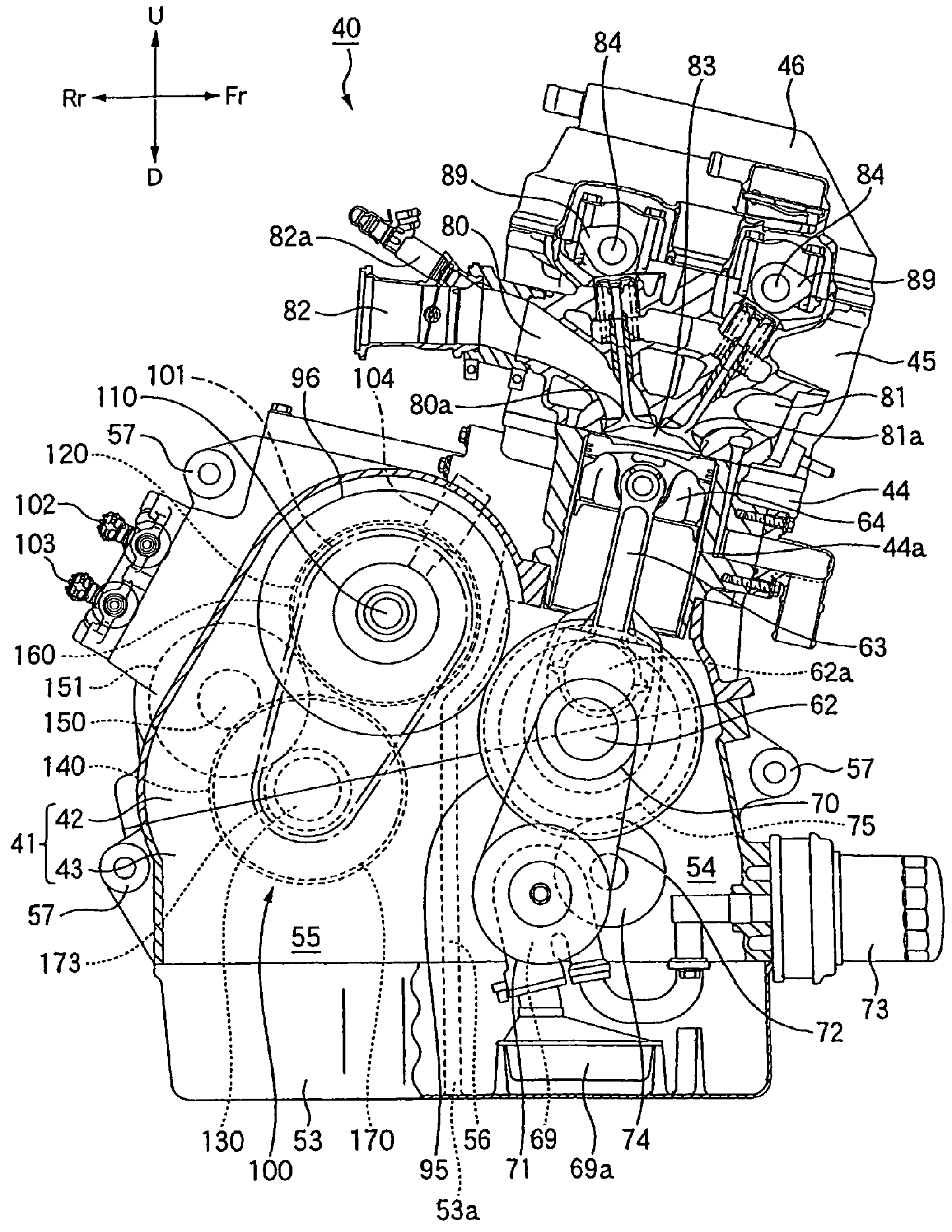
FIG. 3 is a right side view with a part broken away of the power unit of the vehicle shown in FIG. 1.
Figure 4:
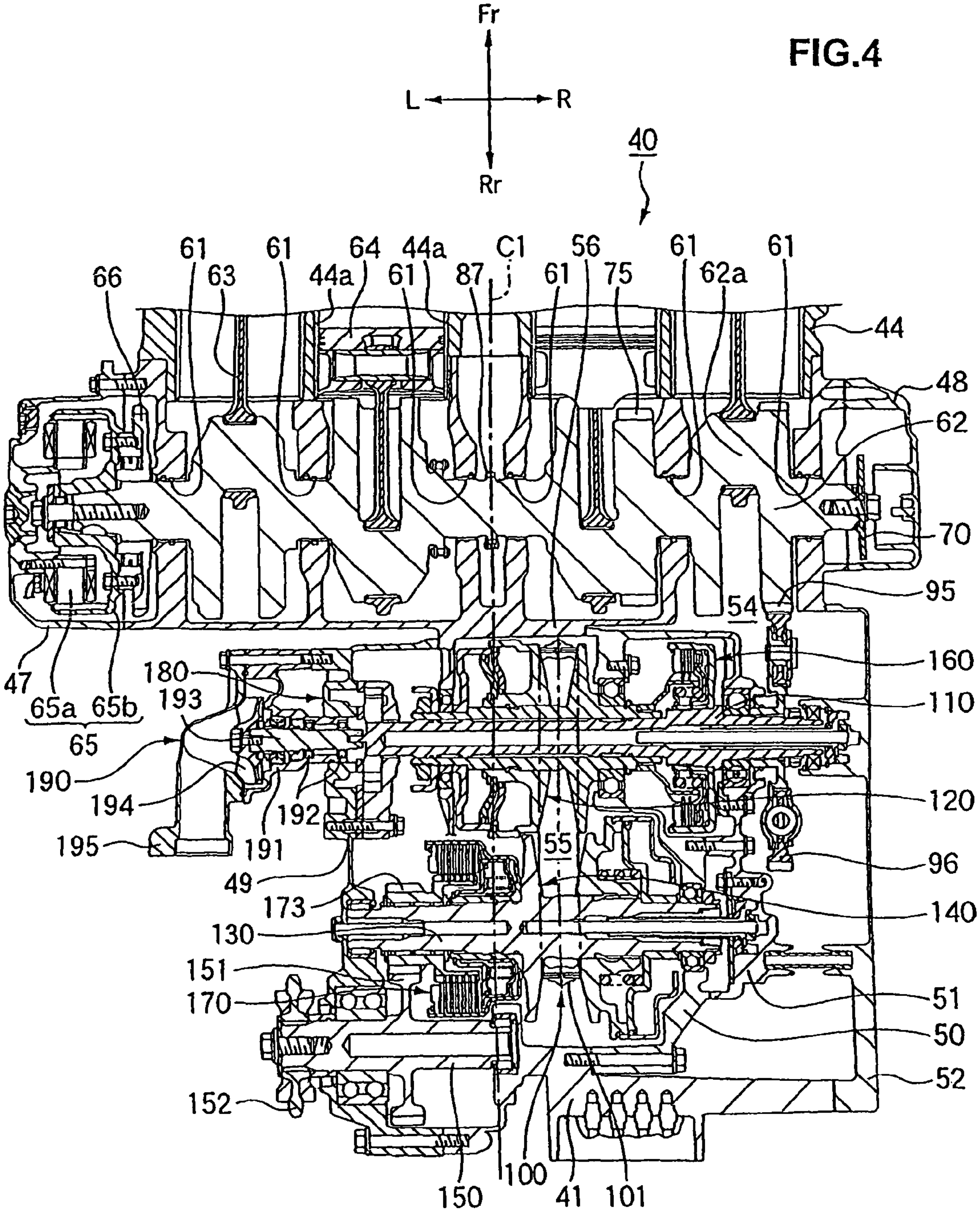
FIG. 4 is a cross-sectional view taken along an arrowed line A-A in FIG. 2.
Figure 5:
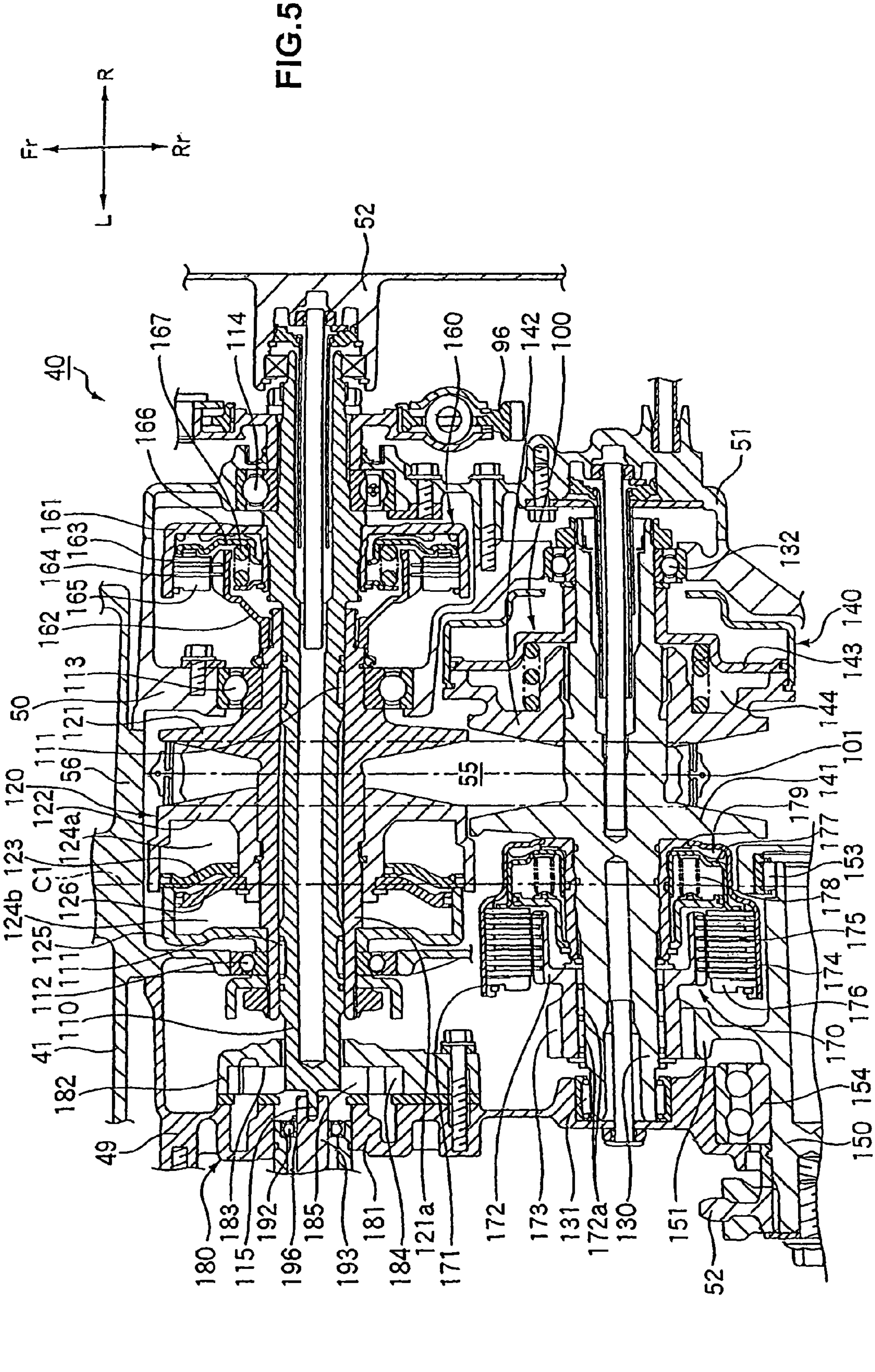
FIG. 5 is an enlarged cross-sectional view of an essential part for explaining a continuously variable transmission shown in FIG. 4.
Figure 6:
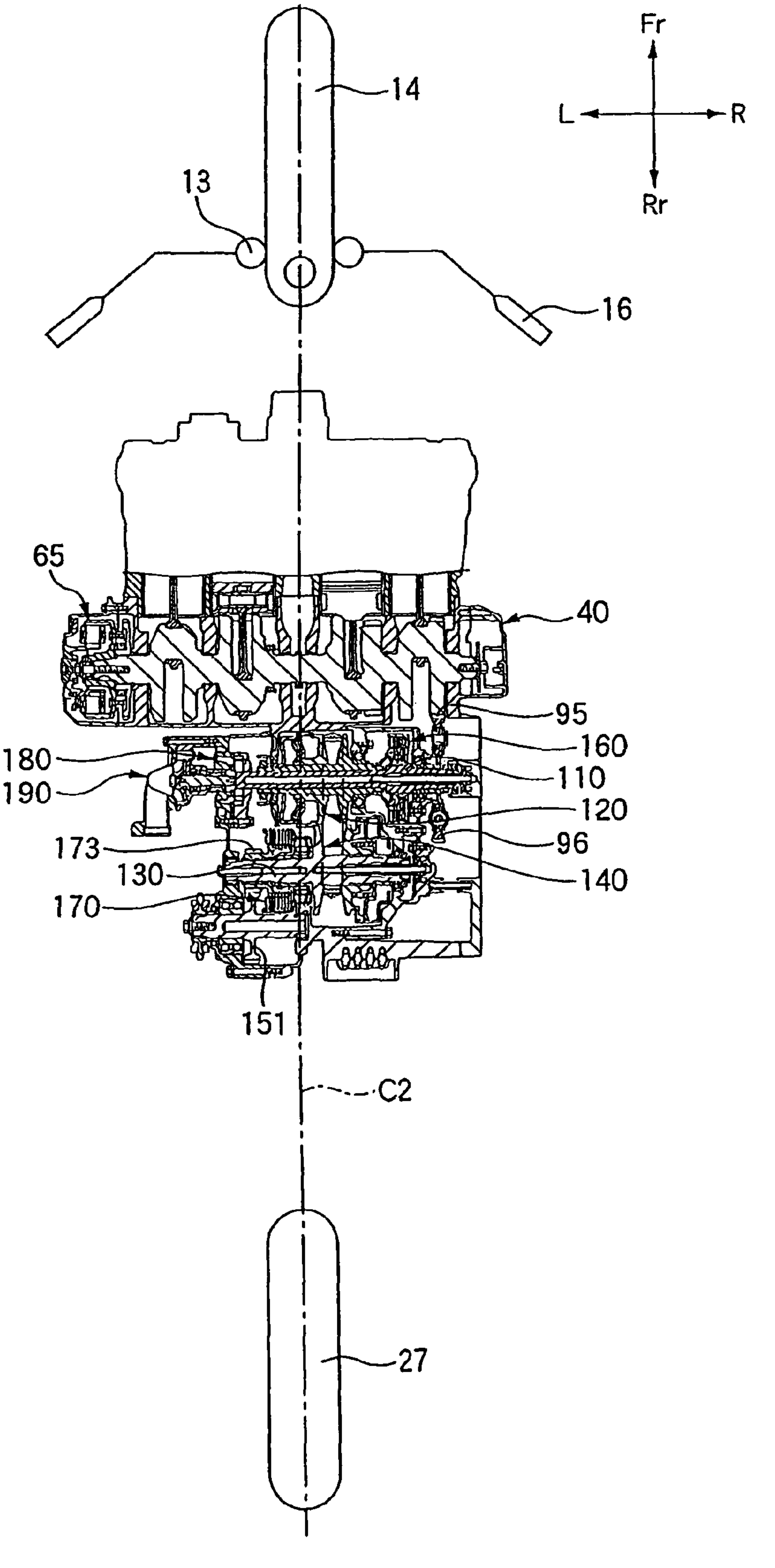
FIG. 6 is a schematic view for explaining arrangement positions of the various components of the engine and the CVT in a vehicle width direction.
Figure 7:
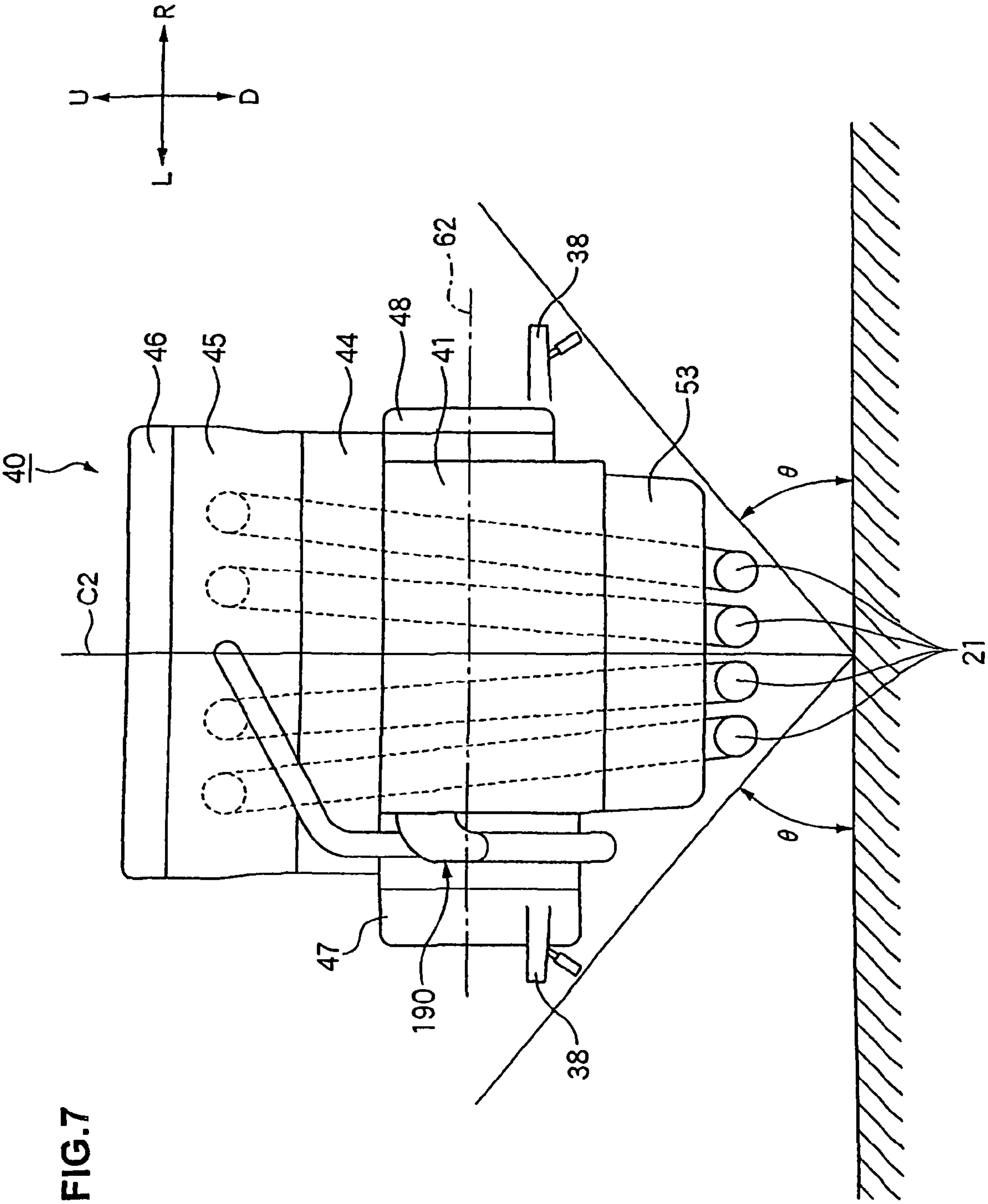
FIG. 7 is a schematic view for explaining a relationship between the power unit of the vehicle and a bank angle of the vehicle.

FIG. 1 to FIG. 7 are views showing a first illustrative embodiment of the present invention. FIG. 1 is a side view of a vehicle having the power unit mounted thereon according to the present invention. FIG. 2 is a left side view with a part broken away of the power unit of the vehicle shown in FIG. 1. FIG. 3 is a right side view with a part broken away of the power unit of the vehicle shown in FIG. 1. FIG. 4 is a cross-sectional view taken along an arrowed line A-A in FIG. 2. FIG. 5 is an enlarged cross-sectional view of an essential part for explaining the continuously variable transmission shown in FIG. 4. FIG. 6 is a schematic view for explaining arrangement positions of the power unit in a vehicle width direction. FIG. 7 is a schematic view for explaining a relationship between the power unit of the vehicle and a bank angle of the vehicle.

Figure 8:
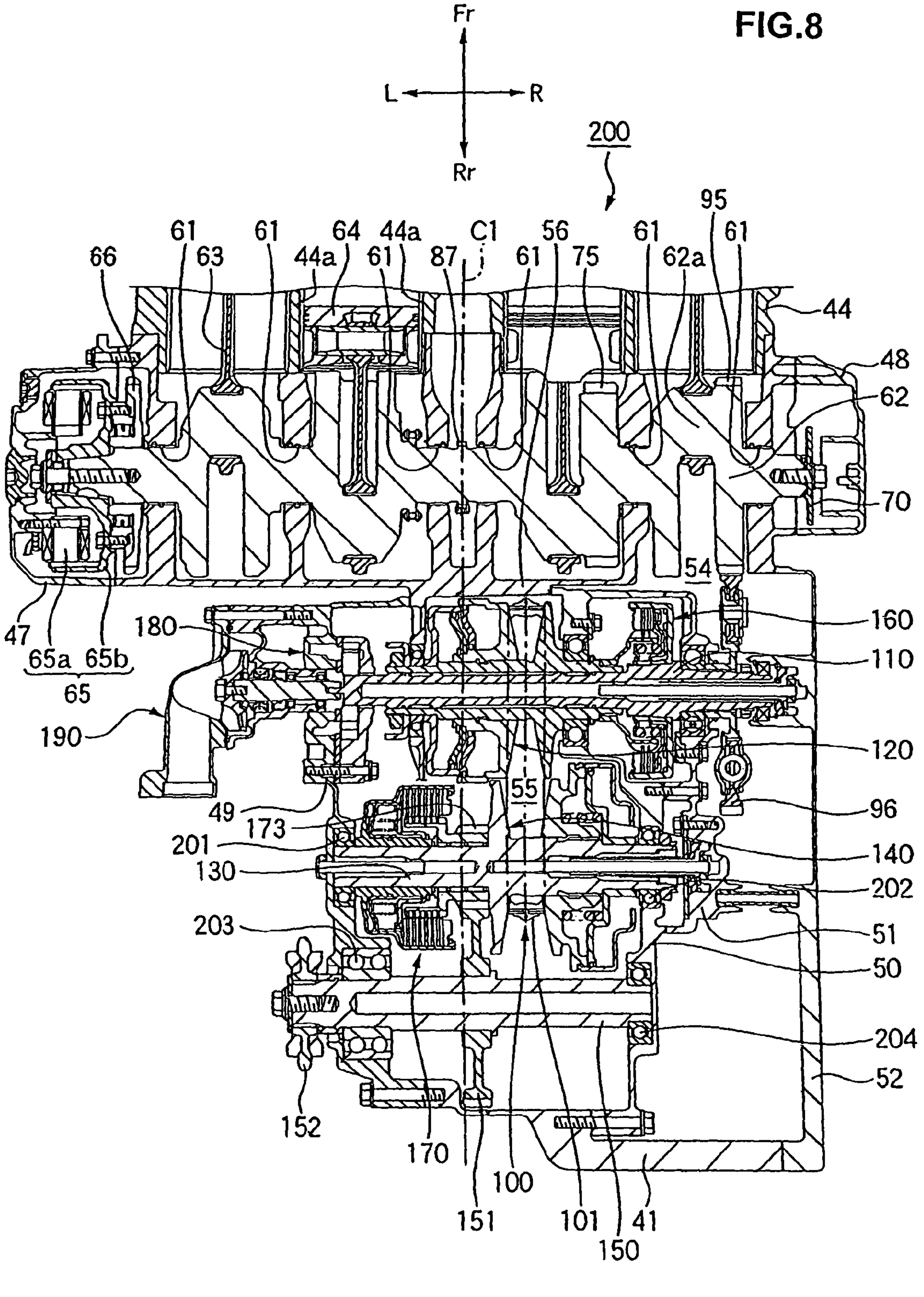
FIG. 8 is a cross-sectional view for explaining a second embodiment of the power unit of the vehicle according to the present invention.

FIG. 8 is a view showing a second embodiment of the present invention. FIG. 8 is a cross-sectional view for explaining the second embodiment of a power unit including an engine of a vehicle, such as a motorcycle according to the present invention.

Here, in the explanation made hereinafter, front and rear sides, left and right sides, and upper and lower sides are determined in accordance with the directions as viewed from a driver (operator of the vehicle). The front side is indicated by Fr, the rear side is indicated by Rr, the left side is indicated by L, the right side is indicated by R, the upper side is indicated by U, and the lower side is indicated by D.

First Embodiment

First of all, the first embodiment of the power unit including an engine and a continuously variable transmission for a vehicle such as a motorcycle, according to the present invention is discussed below in conjunction with FIG. 1 to FIG. 7.

As shown in FIG. 1, a vehicle (motorcycle) 10 of the present invention includes a cradle type vehicle body frame 11, a front fork 13 which is mounted on a head pipe 12 of the vehicle body frame 11, a front wheel 14 and a front fender 15 which are mounted on the front fork 13, a handle 16 which is connected to the front fork 13, a fuel tank 17 which is mounted on a front upper portion of the vehicle body frame 11 in a striding manner, a seat 18 (a double seat having a rider's seat and a pillion's seat) which is mounted on a rear upper portion of the vehicle body frame 11.

The motorcycle 10 includes a power unit (having an engine 40 and a continuously variable transmission 100) arranged in the a cradle space surrounded by respective pipes of the vehicle body frame 11, an air cleaner 19 arranged behind the cradle space and below the seat 18, a carburetor 20 connected between the air cleaner 19 and an intake port of the engine 40, an exhaust pipe 21 connected to the exhaust port of the engine 40, a conversing portion 22, a silencer 23, a radiator 24 arranged in front of the power unit 40, a swing arm 25 mounted behind the vehicle body frame 11 by way of a pivot shaft 25*a*, a rear suspension 26 suspending a rear end portion of the swing arm 25 from the vehicle body frame 11, and a rear wheel (drive wheel) 27 mounted on a rear portion of the swing arm 25.

The motorcycle 10 also includes a head lamp 28, a tail lamp 29, a front blinker 30, a rear blinker 31, a meter 32, a side cover 33, a rear cowl 34, a grab rail 35, a rear fender 36, a step bracket 37, a step 38, and a stand 39.

The engine 40 is a water-cooled series 4-cylinder engine. As shown in FIG. 2 to FIG. 4, an outer shell of the engine 40 is mainly constituted of a crankcase 41 formed of an upper case 42 and a lower case 43.

The engine 40 includes a cylinder block 44 mounted on a front upper end portion of the crankcase 41, a cylinder head 45 mounted on an upper end portion of the cylinder block 44, a head cover 46 covering an upper opening of the cylinder head 45, a first crankcase cover 47 covering a front left opening of the crankcase 41, a second crankcase cover 48 covering a front right opening of the crankcase 41, a first transmission case 49 covering a rear left opening of the crankcase 41, a second transmission case 50 covering a rear right opening of the crankcase 41, a transmission case cover 51 covering a right opening of the second transmission case 50, a third crankcase cover 52 covering an outer opening of the transmission case cover 51 of the crankcase 41, and an oil pan 53 covering a lower end opening of the crankcase 41.

Then, ranging from a front portion to a right rear portion of the engine 40, a crank chamber 54 is formed of the crankcase 41, the second transmission case 50, the transmission case cover 51 and the third crankcase cover 52. On a rear portion of the engine 40, a transmission chamber 55 is formed of the crankcase 41, the first transmission case 49 and the second transmission case 50. In the crankcase 41, a partition wall 56 which defines the crank chamber 54 and the transmission chamber 55 by partitioning is formed.

Further, also in the oil pan 53, a partition wall 53*a* which defines the crank chamber 54 and the transmission chamber 55 by partitioning is formed in a state that the partition wall 53*a* is contiguously formed with the partition wall 56. A chamber which stores engine oil is formed in a front portion of the oil pan 53, and a chamber which stores continuously-variable-transmission oil is formed in a rear portion of the oil pan 53. Due to such a constitution, oils which are respectively suitable for the engine 40 and the CVT 100 (described later) can be used.

The engine 40 is mounted on the vehicle body frame 11 via engine hangers 57 which are respectively formed on a front portion, a rear upper portion and a rear lower portion of the crankcase 41. As shown in FIG. 6, the engine 40 is arranged in a state that an engine center line C1 (see FIG. 4) in the vehicle-width direction overlaps a vehicle-center line C2 in the vehicle-width direction of the motorcycle 10, as viewed in a plan view.

As shown in FIG. 4, in the crank chamber 54, a crankshaft 62 is rotatably supported by six journal bearings 61 which are mounted on the crankcase 41. As shown in FIG. 2 and FIG. 3, pistons 64 are connected to crankpins 62*a* of the crankshaft 62 via connecting rods 63 of the respective cylinders, and the pistons 64 perform a reciprocating motion in the cylinder axial direction inside cylinder liners 44*a* of the cylinder block 44.

Further, as shown in FIG. 4, an AC generator 65 is mounted on a left end portion of the crankshaft 62. The AC generator 65 includes a stator 65*a* which is mounted on an inner surface of the first crankcase cover 47, and a rotor 65*b* which is mounted on a left end portion of the crankshaft 62 and which surrounds the stator 65*a*.

Further, as shown in FIG. 4, on a shaft portion of the crankshaft 62, a starter driven gear 66 is mounted close to the AC generator 65. The starter driven gear 66 transmits a rotational drive force of a starter motor 68 to the crankshaft 62 via a gear train 67 (see FIG. 2). The gear train 67 includes a starter pinion gear 67*a*, a first idling driven gear 67*b*, a first idling drive gear 67*c* and a second idling gear 67*d*, and is connected to the starter driven gear 66.

Further, as shown in FIGS. 3 and 4, a pump drive sprocket wheel 70 is mounted on a right end portion of the crankshaft 62. The pump drive sprocket wheel 70 drives an oil pump 69 by transmitting a rotational drive force of the crankshaft 62 to the oil pump 69 via a pump chain 72 which is extended between and wrapped around a pump driven sprocket wheel 71 mounted on a drive shaft of the oil pump 69 and the pump drive sprocket wheel 70 (see FIG. 3). The oil pump supplies oil to respective portions of the engine 40 (parts arranged inside the crank chamber 54, the cylinder block 44, the cylinder head 45, and parts arranged inside the head cover 45).

Further, the oil pump 69 draws (sucks), via suction, engine oil stored in a front portion of the oil pan 53 and below the crank chamber 54 through an oil strainer 69*a* and supplies the engine oil to lubrication portions and the like inside the cylinder block 44, the cylinder head 45, the head cover 46 and the crank chamber 54. As shown in FIG. 2 and FIG. 3, an oil filter element 73 is operatively attached to the oil pump 69.

Further, as shown in FIG. 3 and FIG. 4, a balancer drive gear 75 is mounted on the shaft portion of the crankshaft 62. The balancer gear 75 is meshed with a balancer gear 74 rotatably supported on the crankcase 41. The balancer gear 74 is rotatably driven at a rotational speed twice as large as a rotational speed of the crankshaft 62.

As shown in FIG. 3, an intake port 80 in which an intake valve 80*a* is arranged, and an exhaust port 81 in which an exhaust valve 81*a* is arranged, are formed in the cylinder head 45. In the intake port 80, a throttle body 82 which includes an electronically controlled injector 82*a* is assembled. The throttle body 82 is controllably connected to an engine control unit (not shown). The throttle body 82 supplies an optimum air/fuel mixture corresponding to a rotational speed of the engine 40 to the intake port 80 in response to an electric signal from the engine control unit.

A combustion chamber 83 is formed in a lower surface of the cylinder head 45, and a spark plug (not shown) is mounted on the cylinder head 45 such that the spark plug faces the combustion chamber 83. As shown in FIG. 2 and FIG. 3, inside the cylinder head 45, two cam shafts 84, 84 of a valve operating mechanism are rotatably supported, and cam driven sprocket wheels 85, 85 are fixed to respective left end portions of the cam shafts 84, 84.

By extending a cam chain 88 between the cam driven sprocket wheels 85, 85 and a cam drive sprocket wheel 87 which is mounted on a center portion of the crankshaft 62 and by wrapping the cam chain 88 around these sprocket wheels 85, 85, and the cam drive sprocket wheel 87, a rotational drive force of the crankshaft 62 is transmitted to the cam shafts 84, 84. At the same time, the cams 89 mounted on the axes of the cam shafts 84, 84 are rotatably driven so that the intake valve 80*a* and the exhaust valve 81*a* are opened and closed at predetermined timings.

As shown in FIG. 2, auxiliary components of the power unit are a chain guide 90, a chain tensioner 91, and a tensioner lifter 92.

As shown in FIG. 4, a crankshaft output gear (primary drive gear) 95 is mounted on the shaft portion of the crankshaft 62. The crankshaft output gear 95 transmits a rotational drive force of the crankshaft 62 to the CVT 100 arranged in the transmission chamber 55. The crankshaft output gear 95 is meshed with a transmission input gear (primary driven gear) 96, which is mounted on a right end portion of a drive pulley shaft 110 of the CVT 100 by spline fitting.

As shown in FIG. 5, the CVT 100 includes the drive pulley shaft 110 to which the rotational drive force of the crankshaft 62 is transmitted, a drive pulley 120 which is mounted on a shaft portion of the drive pulley shaft 110, a driven pulley shaft 130 to which a rotational drive force of the drive pulley shaft 110 is transmitted, a driven pulley 140 which is mounted on a shaft portion of the driven pulley shaft 130, and a belt 101 which is extended between and wrapped around the drive pulley 120 and the driven pulley 140 and transmits a rotational drive force of the drive pulley shaft 110 to the driven pulley shaft 130.

The CVT 100 transmits the rotational drive force of the crankshaft 62 to the drive wheel (e.g., the rear wheel) 27 while continuously changing a vehicle speed by changing wrapping diameters of the belt 101 on the drive pulley 120 and the driven pulley 140.

The drive pulley 120 is rotatably supported on the shaft portion of the drive pulley shaft 110 using roller bearings 111, 111. The drive pulley 120 is rotatably supported on ball bearings 112, 113, 114 which are mounted on the crankcase 41, the second transmission case 50 and the transmission case cover 51, respectively.

The drive pulley 120 is formed of a drive pulley fixed half body 121 and a drive pulley movable half body 122. As described above, the drive pulley fixed half body 121 includes a cylindrical shaft portion 121*a* which is integrally formed with the drive pulley fixed half body 121, and is rotatably supported on the drive pulley shaft 110. The drive pulley movable half body 122 is fitted on the drive pulley fixed half body 121 in the axially movable manner and in a relatively non-rotatable manner.

Further, a drive pulley oil chamber 124*a* is formed between the drive pulley movable half body 122 and a partition plate 123. Another drive pulley oil chamber 124*b* is formed between a fixed bowl-shaped body 125 fitted on the cylindrical shaft portion 121*a* and a partition plate 126.

Oil pressures inside the drive pulley oil chambers 124*a*, 124*b* are controlled by a drive pulley control valve 102 (see FIG. 3). Here, when the oil pressures in the drive pulley oil chambers 124*a*, 124*b* are increased, the drive pulley movable half body 122 is pushed in the direction that the drive pulley movable half body 122 approaches the drive pulley fixed half body 121.

The driven pulley shaft 130 is rotatably supported on a roller bearing 131 and a ball bearing 132 mounted on the first transmission case 49 and the second transmission case 50, respectively. Further, the driven pulley 140 includes a driven pulley fixed half body 141 and a driven pulley movable half body 142. The driven pulley fixed half body 141 is integrally formed with the driven pulley shaft 130 by molding. The driven pulley movable half body 142 is fitted on the driven pulley shaft 130 in the axially movable manner and in a relatively non-rotatable manner.

A driven pulley oil chamber 144 is formed between the driven pulley movable half body 142 and a partition plate 143. An oil pressure of the driven pulley oil chamber 144 is controlled by the driven pulley control valve 103 (see FIG. 3). Here, when the oil pressure of the driven pulley oil chamber 144 is increased, the driven pulley movable half body 142 is pushed in the direction that the driven pulley movable half body 142 approaches the driven pulley fixed half body 141.

An output shaft 150, which transmits a rotational drive force of the driven pulley shaft 130 to the rear wheel 27, is disposed in the transmission chamber 55. The output shaft 150 is rotatably supported by a roller bearing 153 and a double row ball bearing 154 which are mounted on the crankcase 41 and the first transmission case 49, respectively.

A final driven gear 151 is mounted on a shaft portion of the output shaft 150. Further, a drive sprocket wheel 152 is mounted on a left end portion of the output shaft 150. The drive sprocket wheel 152 transmits a rotational drive force of the output shaft 150 to a driven sprocket wheel 27*a* of the rear wheel 27 via a drive chain 99.

Further, in this embodiment, as shown in FIG. 5, a transmission input clutch 160 is arranged between the drive pulley shaft 110 and the drive pulley 120. The transmission input clutch allows or interrupts the transmission of a rotational drive force of the crankshaft 62 to the drive pulley 120.

A starter clutch 170 is arranged between the driven pulley 140 and the output shaft 150. The starter clutch 170 allows or interrupts the transmission of a rotational drive force of the driven pulley shaft 130 to the output shaft 150. Further, the CVT 100 is sandwiched between the transmission input clutch 160 and the starter clutch 170. The transmission input clutch 160 is arranged on one side (on a right side in FIG. 4) (particularly, in the vehicle-width direction in this embodiment) of the CVT 100, and the starter clutch 170 is arranged on another side (on a left side in FIG. 4) of the CVT 100.

The transmission input clutch 160 includes a clutch outer 161, a clutch inner 162, a plurality of drive friction discs 163, a plurality of driven friction discs 164, a pressure receiving plate 165, a pressurizing plate 166 and a coil spring 167.

The clutch outer 161 is mounted on the shaft portion of the drive pulley shaft 110 and is fixed to the drive pulley shaft 110. The clutch inner 162 is fixed to the drive pulley fixed half body 121 of the drive pulley 120. The plurality of drive friction discs 163 is fixed to an inner peripheral surface of the clutch outer 161. The plurality of driven friction discs 164 is arranged alternately with the drive friction discs 163 and is fixed to an outer peripheral surface of the clutch inner 162.

The pressure receiving plate 165 is fixed to an inner peripheral surface of the clutch outer 161 close to the plurality of drive friction discs 163. The pressurizing plate 166 is axially movably mounted on a boss portion of the clutch outer 161. The pressurizing plate 166 pushes the drive friction discs 163 and the driven friction discs 164 to the pressure receiving plate 165. The coil spring 167 constantly biases the pressurizing plate 166 in the direction that the clutch is disengaged.

A transmission input clutch oil chamber 168 is formed between the clutch outer 161 and the pressurizing plate 166. The oil pressure in the transmission input clutch oil chamber 168 is controlled by a transmission input clutch control valve 104 (see FIG. 3).

Here, when the oil pressure in the inside of the transmission input clutch oil chamber 168 is increased, the pressurizing plate 166 is pushed against a biasing force of the coil spring 167. Accordingly, the transmission input clutch 160 is engaged whereby the drive pulley 120 is rotatably driven together with the drive pulley shaft 110.

The starter clutch 170 includes a clutch outer 171, a clutch inner 172, a final drive gear 173, a plurality of drive friction discs 174, a plurality of driven friction discs 175, a pressure receiving plate 176, a pressurizing plate 177 and a coil spring 178.

The clutch outer 171 is arranged on a shaft portion of the driven pulley shaft 130 and is fixed to the driven pulley shaft 130. The clutch inner 172 is relatively rotatably mounted on the driven pulley shaft 130 using a roller bearing 172*a*. The clutch inner 172 integrally forms the final drive gear 173 which is meshed with the final driven gear 151 of the output shaft 150 on an outer peripheral surface of the boss portion thereof by molding.

The plurality of drive friction discs 174 is fixed to an inner peripheral surface of the clutch outer 171. The plurality of driven friction discs 175 is arranged alternately with the drive friction discs 174 and is fixed to an outer peripheral surface of the clutch inner 172. The pressure receiving plate 176 is fixed to an inner peripheral surface of the clutch outer 171 close to the plurality of drive friction discs 174.

The pressurizing plate 177 is axially movably mounted on a boss portion of the clutch outer 171. The pressurizing plate pushes the drive friction discs 174 and the driven friction discs 175 towards the pressure receiving plate 176. The coil spring 178 constantly biases the pressurizing plate 177 in the direction that the clutch is disengaged.

Further, a starter clutch oil chamber 179 is formed between the clutch outer 171 and the pressurizing plate 177. The oil pressure inside the starter clutch oil chamber 179 is controlled by the starter clutch control valve 105 (see FIG. 2). Here, when the oil pressure inside the starter clutch oil chamber 179 is increased, the pressurizing plate 177 is pushed against a biasing force of the coil spring 178. Accordingly, the starter clutch 170 is engaged whereby the final drive gear 173 is rotatably driven together with the driven pulley shaft 130.

Further, in this embodiment, as shown in FIG. 2 and FIG. 3, the drive pulley shaft 110 and the driven pulley shaft 130 are arranged in parallel to each other with respect to the crankshaft 62 having an axis along the vehicle-width direction of the motorcycle 10. The drive pulley shaft 110 is arranged above the driven pulley shaft 130. The starter clutch 170, mounted on the shaft portion of the driven pulley shaft 130, is arranged at a level below the transmission input clutch 160 which is mounted on the shaft portion of the drive pulley shaft 110.

Further, in this embodiment, as shown in FIG. 4, the transmission input clutch 160, the oil pump 180 and the water pump 190 are mounted on the shaft portion of the drive pulley shaft 110 with the CVT 100 sandwiched therebetween. The transmission input clutch 160 is arranged on one side of the CVT 100, and the oil pump 180 and the water pump 190 are arranged on another side of the CVT 100 opposite to the transmission input clutch 160. That is, the oil pump 180 and the water pump 190 are arranged on a left end portion of the drive pulley shaft 110, and the transmission input clutch 160 is arranged on a right end portion thereof.

The oil pump 180 is a trocoid-type pump. As shown in FIG. 4, the oil pump 180 includes an oil pump body 181 which is integrally formed on an outer side wall of the first transmission case 49 by molding, an oil pump cover 182 which is mounted on the oil pump body 181 and forms a recessed hole 183 therein, an outer rotor 184 which is inserted in the recessed hole 183, and an inner rotor 185 which is inserted in the outer rotor 184 and is joined to the drive pulley shaft 110 by spline fitting.

The oil pump 180 is rotatably driven together with the drive pulley shaft 110. Here, the oil pump 180 sucks continuously-variable-transmission oil stored in a rear portion of the oil pan 53 and below the transmission chamber 55 through an oil strainer (not shown), and supplies the oil to a lubrication portion in the transmission chamber 55, the drive pulley 120, the driven pulley 140, the transmission input clutch 160, the starter clutch 170 and the like.

As shown in FIG. 4, the water pump 190 includes a water pump body 191 mounted on an outer surface of the first transmission case 49, a pump shaft 193 rotatably supported by two ball bearings 192, 192 (also see FIG. 5) mounted in the water pump body 191, rotary blades 194 mounted on a left end portion of the pump shaft 193, and a water pump cover 195 mounted on the water pump body 191. A pump chamber is defined between the water pump body 191 and the water pump cover 195.

As shown in FIG. 5, a recessed portion 196 is formed in a right end portion of the pump shaft 193. A projecting portion 115 which is formed on a left end portion of the drive pulley shaft 110 is fitted in the recessed portion 196. Due to such an arrangement, the drive pulley shaft 110 and the pump shaft 193 are connected to each other. Hence, the water pump 190 is rotatably driven together with the rotation of the drive pulley shaft 110. Accordingly, the water pump 190 circulates cooling water inside the engine 40 by way of a cooling water circulation passage (not shown) when drive pulley shaft 110 is operational.

The CVT 100 is arranged in an offset manner on one side (on a right side in FIG. 4) in the vehicle-width direction from the center of the engine 40 (the engine center line C1). The transmission input clutch 160 and the transmission input gear (primary driven gear) 96 are arranged on the offset side, and the starter clutch 170, the oil pump 180, the water pump 190, the final drive gear 173 and the AC generator 65 are arranged on a side opposite to the offset side (left side in FIG. 4).

In the power unit, as discussed above, even when the starter clutch 170 is disengaged before the CVT 100 assumes a low speed state at the time of stopping the vehicle, a rotary drive force of the crankshaft 62 is transmitted to the drive pulley 120 of the CVT 100 by way of the transmission input clutch 160. Hence, the CVT 100 is shifted to the low speed state during a period when the vehicle is stopped. Accordingly, the CVT 100 is not driven in a high speed state at the time of starting the vehicle next time. Hence, there is no possibility that the maneuverability of the motorcycle 10 is lowered.

Further, even when the crankshaft 62 is rotated at the time of starting the engine, by bringing the transmission input clutch 160 into a disengagement state, it is possible to drive the oil pump 180 and the water pump 190 without driving the CVT 100. Accordingly, only devices which are necessary at the time of starting the engine can be driven. Hence, a load applied to a starter motor (starter) 68 can be reduced.

As has been explained above, the transmission input clutch 160 which allows or interrupts the transmission of the rotational drive force of the crankshaft 62 to the drive pulley 120 is arranged between the crankshaft 62 and the drive pulley 120. The starter clutch 170 which allows or interrupts the transmission of the rotational drive force of the driven pulley shaft 130 to the drive wheel 27 is arranged between the driven pulley 140 and the drive wheel 27. The transmission input clutch 160 and the starter clutch 170 are arranged with the CVT 100 sandwiched therebetween, i.e., the transmission input clutch 160 is arranged on one of side of the belt 101 and the starter clutch 170 is arranged on the other side of the belt 101.

Accordingly, even when the starter clutch 170 is disengaged before the CVT 100 assumes a low speed state at the time of stopping the vehicle, the rotational drive force of the crankshaft 62 is transmitted to the CVT 100 by way of the transmission input clutch 160. Hence, it is possible to bring the CVT 100 from a high speed state into a low speed state whereby the maneuverability of the vehicle at the time of starting the vehicle can be enhanced.

Further, it is possible to interrupt the transmission of the rotational drive force of the crankshaft 62 to the drive pulley 120 at the time of starting the engine. Accordingly, a load applied to the starter 68 can be reduced thus realizing miniaturization of the starter 68.

Also, the transmission input clutch 160 and the starter clutch 170 which are heavy components of the power unit can be arranged on both sides in the vehicle-width direction in a well-balanced manner with the CVT 100 sandwiched therebetween. Accordingly, the maneuverability of the vehicle 10 can be enhanced.

As discussed above, the transmission input clutch 160 is mounted on the shaft portion of the drive pulley shaft 110, and the starter clutch 170 is mounted on the shaft portion of the driven pulley shaft 130. Accordingly, no additional shafts are required for mounting the transmission input clutch 160 and the starter clutch 170. Hence, compared to a case in which shafts are provided separately for the transmission input clutch and the starter clutch, the number of shafts can be decreased thus decreasing the number of parts whereby the miniaturization of the power unit can be realized.

Further, as discussed above, the power unit includes the oil pump 180 for supplying oil to the CVT 100, the transmission input clutch 160 and the starter clutch 170, and the water pump 190 which circulates cooling water inside the engine 40. The transmission input clutch 160, the oil pump 180 and the water pump 190 are arranged such that the CVT 100 is sandwiched therebetween in a state that the oil pump 180 and the water pump 190 are mounted on the shaft portion of the drive pulley shaft 110 on one side and the transmission input clutch 160 is arranged on the other side such that the CVT 100 is sandwiched therebetween.

Accordingly, the transmission input clutch 170, the oil pump 180 and the water pump 190, which are heavy components, can be arranged on both sides of the CVT 100 in a well-balanced manner with the CVT 100 sandwiched therebetween. Hence, the maneuverability of the vehicle 10 can be enhanced. Further, the oil pump 180 and the water pump 190 are mounted on the same shaft and hence, compared to a case in which the oil pump 180 and the water pump 190 are mounted on different shafts, drive parts of the respective pumps 180, 190 and spaces for arranging the respective pumps 180, 190 become unnecessary thus realizing the miniaturization of the power unit.

Further, according to the power of this embodiment, the starter clutch 170 (the starter clutch 170 being provided for the transmission of a rotational drive force larger than the rotational drive force of the transmission input clutch 160 at the time of starting the vehicle and hence, the clutch capacitance is increased whereby the starter clutch 170 is liable to become large-sized compared to the transmission input clutch 160 leading to the increase of a weight of the starter clutch 170) is arranged at a level below the transmission input clutch 160. Accordingly, the center of gravity of the engine 40 (also that of the power unit) can be lowered. Hence, the maneuverability of the vehicle 10 can be enhanced.

Further, as described above, the crankshaft 62, the drive pulley shaft 110 and the driven pulley shaft 130 are arranged in parallel to each other and extend in the vehicle-width direction, the drive pulley shaft 110 is arranged above the driven pulley shaft 130, and the oil pump 180 and the water pump 190 are arranged on the shaft end of the drive pulley shaft 110. Accordingly, the oil pump 180 and the water pump 190 are arranged on the shaft end of the drive pulley shaft 110, the oil pump 180 and the water pump 190 are arranged at a position higher than the driven pulley shaft 130, that is, at an upper high position of the engine 40 and hence, there is no possibility that a bank angle θ of the vehicle 10 determined by the step 38 is not influenced by the oil pump 180 and the water pump 190.

Further, the final drive gear 173 mounted on the shaft portion of the driven pulley shaft 130, and the primary driven gear 96 mounted on the shaft portion of the drive pulley shaft 110. The final drive gear 173 transmits the rotational drive force of the driven pulley shaft 130 to the drive wheel 27. The primary driven gear 96 transmits the rotational drive force of the crankshaft 62 to the drive pulley shaft 110. The final drive gear 173 and the primary driven gear 96 are arranged with the CVT 100 sandwiched therebetween in a state that the final drive gear 173 is arranged on the starter clutch 170 side and the primary driven gear 96 is arranged on the transmission input clutch 160 side.

Accordingly, the transmission input clutch 160 and the starter clutch 170 as well as the final drive gear 173 and the primary driven gear 96 which are heavy components (objects) can be arranged on both sides of the CVT 100 in a well-balanced manner with the CVT 100 sandwiched therebetween and hence, the maneuverability of the vehicle 10 can be enhanced.

Further, the power unit includes the oil pump 180 for supplying oil to the CVT 100, the transmission input clutch 160 and the starter clutch 170, and the drive pulley 120 is rotatably supported on the drive pulley shaft 110 and is rotatably driven together with the drive pulley shaft 110 when the transmission input clutch 160 assumes an engagement state, and the oil pump 180 is arranged on the shaft portion of the drive pulley shaft 110 and is rotatably driven together with the drive pulley shaft 110.

Hence, by bringing the transmission input clutch 160 into a disengagement state at the time of starting the engine, it is possible to drive the oil pump 180 without driving the CVT 100. Accordingly, an oil pressure for controlling the transmission input clutch 160 and the CVT 100 can be acquired. Hence, before engaging the transmission input clutch 160, it is possible to push the respective pulleys 120, 140 to the belt 101 by applying the oil pressure to the respective pulleys 120, 140 whereby it is possible to suppress the generation of slippage between the respective pulleys 120, 140 and the belt 101 at the time of engaging the transmission input clutch 160 after starting the engine.

Further, in the power unit as described above, the transmission input clutch 160, which allows or interrupts the transmission of the rotational drive force of the crankshaft 62 to the drive pulley 120, is arranged between the crankshaft 62 and the drive pulley 120. The starter clutch 170, which allows or interrupts the transmission of the rotational drive force of the driven pulley shaft 130 to the drive wheel 27, is arranged between the driven pulley 140 and the drive wheel 27.

The CVT 100 is arranged in an offset manner on one side (an offset side) in the vehicle width direction from the center of the engine 40, the transmission input clutch 160 and the primary driven gear 96 are arranged on an offset side, and the starter clutch 170, the oil pump 180, the water pump 190, the final drive gear 173 and the generator 65 are arranged on a side opposite to the offset side.

Accordingly, even when the starter clutch 170 is disengaged before the CVT 100 assumes a low speed state at the time of stopping the vehicle, the rotational drive force of the crankshaft 62 is transmitted to the CVT 100 by way of the transmission input clutch 160. Hence, it is possible to bring the CVT 100 from a high speed state into a low speed state whereby the maneuverability of the vehicle at the time of starting the vehicle can be enhanced.

Further, it is possible to interrupt the transmission of the rotational drive force of the crankshaft 62 to the drive pulley 120 at the time of starting the engine. Hence, a load applied to the starter 68 can be reduced thus realizing the miniaturization of the starter 68.

Further, the transmission input clutch 160 and the primary driven gear 96 as well as the starter clutch 170, the oil pump 180, the water pump 190, the final drive gear 173 and the generator 65 which are heavy components (objects) can be arranged on both sides of a vehicle body center line C2 in a well-balanced manner with the vehicle body center line C2 sandwiched therebetween. Hence, the maneuverability of the vehicle 10 can be enhanced.

Further, the CVT 100 is arranged in an offset manner on one side in the vehicle width direction from the center of the engine 40 and hence, projecting quantities of the starter clutch 170, the oil pump 180, the water pump 190, and the final drive gear 173 which are arranged on a side opposite to the offset side in the vehicle width direction can be decreased (and/or controlled). Accordingly, it is possible to further prevent these objects from influencing the bank angle θ of the vehicle 10.

Second Embodiment

Next, the second embodiment of the power unit is discussed in conjunction with FIG. 8. Here, same symbols are given to parts/elements which are identical with or similar to the parts of the first embodiment in the drawing and their explanation is omitted or simplified.

In the power unit of the second embodiment, a final drive gear 173 mounted on a shaft portion of a driven pulley shaft 130 and is arranged between a driven pulley 140 a starter clutch 170 in the vehicle-width direction. A double row ball bearing 203 which rotatably supports an output shaft 150 is arranged more inwardly of the vehicle-width direction (i.e., towards the center line of the vehicle) than a ball bearing 201 which rotatably supports the driven pulley shaft 130.

According to the second embodiment, the driven pulley shaft 130 is rotatably supported on the ball bearing 201 and a ball bearing 202 which are mounted on a first transmission case 49 and a second transmission case 50, respectively. The output shaft 150 is rotatably supported on the double row ball bearing 203 and a double row ball bearing 204 which are mounted on the first transmission case 49 and the second transmission case 50, respectively. Further, a final driven gear 151 is formed as a part separate from the output shaft 150 and is fitted on and is fixed to the output shaft 150.

As discussed above, in the power unit of this embodiment, a drive pulley shaft 110 and the driven pulley shaft 130 are arranged in parallel to each other with respect to the crankshaft 62 having an axis along the vehicle-width direction of a motorcycle 10. The power unit includes a final drive gear 173 which is mounted on a shaft portion of the driven pulley shaft 130 and transmits a rotational drive force of the driven pulley shaft 130 to a drive wheel 27, and the final drive gear 173 is arranged between the driven pulley 140 and the starter clutch 170.

Accordingly, the bearing 203 which rotatably supports the output shaft 150 can be arranged more inwardly in the vehicle-width direction than the bearing 201 which rotatably supports the driven pulley shaft 130. Hence, it is possible to achieve the miniaturization of the power unit.

Further, according to the power unit of this embodiment, the crankshaft 62, the drive pulley shaft 110 and the driven pulley shaft 130 are arranged parallel to each other and extend in the vehicle-width direction. The power unit includes the output shaft 150 which mounts the final driven gear 151 meshed with the final drive gear 173 thereon, and transmits the rotational drive force of the driven pulley shaft 130 to the drive wheel 27, and the bearing 203 which rotatably supports the output shaft 150 is arranged more inside in the vehicle width direction than the bearing 201 which rotatably supports the driven pulley shaft 130.

Accordingly, in mounting a drive sprocket wheel 152 on the shaft end of the output shaft 150, for example, the drive sprocket wheel 152 can be arranged inward of the vehicle width direction. Hence, the miniaturization of the power unit can be realized.

Further, according to the power unit of this embodiment, the final drive gear 173 is mounted on the shaft portion of the driven pulley shaft 130 and transmits the rotational drive force of the driven pulley shaft 130 to the drive wheel 27, and the final drive gear 173 arranged between the transmission input clutch 160 and the starter clutch 170. Hence, the bearing 203 which rotatably supports the output shaft 150 can be arranged more inward of the power unit than a left shaft end of the driven pulley shaft 130 and a left shaft end of the drive pulley shaft 110.

Accordingly, in mounting the drive sprocket wheel 152 on the shaft end of the output shaft 150, for example, the projecting quantity of the drive sprocket wheel 152 toward the outside of the engine 200 can be reduced thus achieving the miniaturization of the power unit.

Other constitutions, operations and advantages are equal to those of the above-mentioned first embodiment.

Here, the present invention is not limited to the above-mentioned respective embodiments. For example, in the above-mentioned respective embodiments, the case in which the present invention is applied to the crank horizontally arranged engine which arranges the crankshaft in parallel to the vehicle-width direction has been exemplified. However, the present invention is not limited to such a crank horizontally arranged engine and is also applicable to a crank vertically arranged engine which arranges the crankshaft orthogonal to the vehicle-width direction. Further, even when the drive pulley shaft and the driven pulley shaft are arranged vertically in the same manner, it is possible to obtain advantages equal to those of the above-mentioned respective embodiments.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. In a vehicle of the type comprising a vehicle body frame, an engine having a crankshaft, and a continuously variable transmission having a drive pulley shaft having a drive pulley mounted thereon, said drive shaft operatively connected to the crankshaft, a driven pulley shaft having a driven pulley mounted thereon, a belt extended between and wrapped around the drive pulley and the driven pulley for transmitting a rotary drive force of the drive pulley shaft to the driven pulley shaft; the improvement comprising:

a transmission input clutch mounted on a first end of the drive pulley shaft, wherein said transmission input clutch allows or interrupts the transmission of a rotary drive force of the crankshaft to the drive pulley;

- a starter clutch mounted on the driven pulley shaft, wherein said starter clutch allows or interrupts the transmission of a rotary drive force of the driven pulley shaft to a drive wheel of the vehicle;
- a generator mounted on the crankshaft,
- wherein said continuously variable transmission transmits a rotary drive force of the crankshaft to the drive wheel while continuously changing a vehicle speed by changing wrapping diameters of the belt on the drive pulley and the driven pulley;
- an oil pump mounted on the drive pulley shaft, wherein said oil pump supplies oil to the drive pulley, the driven pulley, the belt, the transmission input clutch and the starter clutch;
- a water pump mounted on a second end of the drive pulley shaft opposite said first end, wherein said water pump circulates cooling water inside the engine;
- a primary driven gear mounted on the drive pulley shaft, wherein said primary driven gear transmits the rotary drive force of the crankshaft to the drive pulley shaft; and
- a final drive gear mounted on the driven pulley shaft, wherein said final drive gear operatively transmits the rotary drive force of the driven pulley shaft to the drive wheel.

2. A vehicle according to claim 1, wherein the primary driven gear and the final drive gear are arranged such that the continuously variable transmission is sandwiched therebetween.

3. A vehicle according to claim 1, wherein the engine is mounted on the vehicle body frame such that a center line of the engine in a vehicle-width direction overlaps a center line of the vehicle; wherein the starter clutch, the oil pump, the water pump, the final drive gear and the generator are arranged on one side of the center line of the engine, and the transmission input clutch and the primary driven gear are arranged on the other side of the center line of the engine.

4. A vehicle according to claim 1, further comprising:

- a final driven gear;
- an output shaft having the final driven gear mounted thereon;
- a bearing which rotatably supports the driven pulley shaft; and
- a bearing which rotatably supports the output shaft arranged more inwardly in a vehicle-width direction towards the center line of the vehicle than a bearing which rotatably supports the driven pulley shaft;
- wherein the crankshaft, the drive pulley shaft and the driven pulley shaft are arranged in parallel to each other and extend in the vehicle-width direction.

5. A vehicle according to claim 1, wherein the transmission input clutch and the starter clutch are arranged on opposite sides of the belt; and wherein the starter clutch is disposed at a level below the transmission input clutch.

* * * * *